Sept. 22, 1931.    W. E. WINE    1,824,645
RAILWAY HOPPER CAR DOOR FRAME
Filed May 5, 1928    2 Sheets-Sheet 1

Inventor
William E. Wine
By Ritter & Mechlin
His Attorneys

Sept. 22, 1931. W. E. WINE 1,824,645
RAILWAY HOPPER CAR DOOR FRAME
Filed May 5, 1928 2 Sheets-Sheet 2

Inventor
William E. Wine
By Ritter & Mechlin
his Attorneys

Patented Sept. 22, 1931

1,824,645

UNITED STATES PATENT OFFICE

WILLIAM E. WINE, OF TOLEDO, OHIO

RAILWAY HOPPER CAR DOOR FRAME

Application filed May 5, 1928. Serial No. 275,506.

My invention relates to railway hopper cars and more particularly to door frames for hoppers, the frame being constructed as a unit.

The principal object of the invention is to provide a simple and rugged frame serving to strengthen the hopper structure and affording an increased opening through which the cargo or lading in the car may discharge.

A primary feature of the invention consists in providing a hopper car door frame of trapezoidal form having a substantially rectangular lading discharge opening with sealing flanges bordering the cargo discharge opening and with portions affording means for securing the frame to the side sheets of the hopper, one of the side sheet securing portions and the adjacent sealing flange being substantially normal to the hinge axis of the door.

Another feature of the invention consists in providing a hopper car door frame having a lading discharge opening with portions for the attachment of side sheets of a car hopper, one of said side sheet attaching portions being provided with a laterally projecting reinforcing flange having an angularly offset portion for attachment to a car center sill.

A further feature of the invention resides in constructing a hopper car door frame with sealing flanges bordering the sides of the cargo discharge opening and with portions affording means for securing the frame to the side sheets of the hopper, one of the sealing flanges constituting a prolongation of the adjacent side sheet securing portion and the latter being fashioned with a laterally projecting reinforcing flange, the upper edge of which is adapted for attachment to a car center sill.

A still further feature of the invention consists in providing a hopper car door frame with outwardly projecting sealing flanges bordering the cargo discharge opening, and in combining therewith a hinged door for closing the opening, the outer edges of the sealing flanges adjacent the sides of the opening contacting with the inner face of the door when the latter is in closed position and the outer edges of the sealing flanges adjacent the top and bottom of said opening being spaced from the inner face of the door when the latter is in closed position.

Other and more specific features of the invention residing in advantageous forms and relations of parts will hereinafter appear and be pointed out in the claims.

Figure 1:
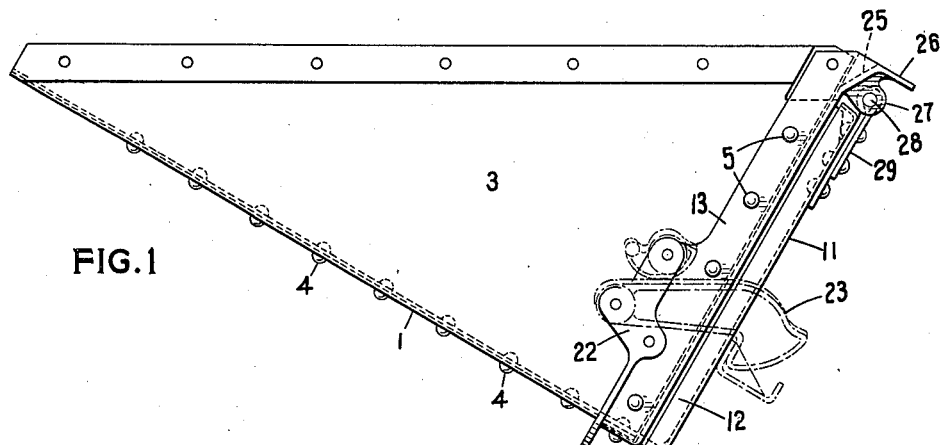
Figure 1 is a side elevational view of a railway car hopper having a door frame embodying the invention applied thereto.
Figure 2:
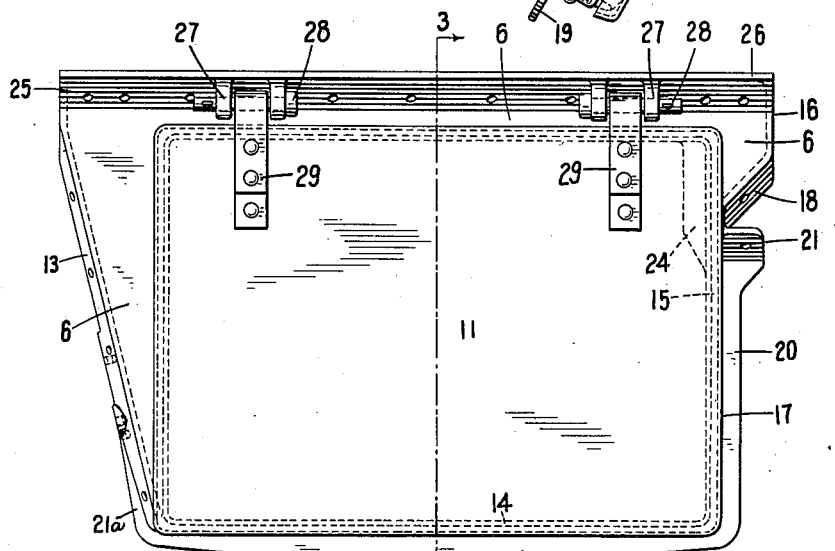
Figure 2 is an end elevational view of the hopper construction, the view being taken normal to the door and the hopper side sheets being omitted.

For the purpose of illustrating the invention a well known form of hopper has been shown comprising an inclined bottom or slope sheet 1 and inner and outer side sheets 2 and 3 respectively. The lower edges of the respective side sheets are flanged inwardly and secured in overlapping relation to the outer face of the slope sheet 1 by rivets 4. The outer side sheet 3 preferably inclines downwardly and inwardly while the inner side sheet 2, which is disposed adjacent the center sill of the car, is substantially vertical.

Rigidly secured to the slope sheet 1 and the side sheets 2 and 3 at the discharge end of the hopper, as by rivets 5, is a door frame which is of substantially trapezoidal form and is preferably cast as a unit. The frame is formed with a plate-like portion 6 having a rectangular cargo discharge opening 7. Bordering the discharge opening and preferably defining the same are outwardly projecting upper and lower sealing flanges 8 and 9 respectively and side sealing flanges 10. These flanges are designed to effectively cooperate with the door 11 and its inwardly projecting flanges 12, in a manner to be hereinafter described, to prevent the accidental escape or loss of lading.

The door frame is provided with inwardly projecting portions or walls 13, 14 and 15 for receiving the rivets 5 for attaching the frame to the hopper, the portions 13 and 15 being respectively secured to the outer and inner side sheets and the portion 14 to the slope sheet. The wall or portion 13 inclines downwardly and inwardly similarly to the outer side sheet 3 and extends at an angle to the adjacent side marginal edge of the lading discharge opening. The wall or portion 15, however, is offset intermediate its ends to provide upper and lower substantially vertical portions 16 and 17 which are connected by a downwardly and inwardly inclined portion 18. The lower portion 17 is offset slightly from the adjacent sealing flange of the frame and is parallel to and substantially coincident with the adjacent side marginal edge of the opening, while the upper portion 16 is spaced outwardly from the latter and is adapted to be secured to an adjacent portion of the center sill (not shown) of the car. The slope sheet attaching portion 14 of the door frame is parallel to and substantially coincident with the bottom marginal edge of the opening, and, in effect, constitutes a prolongation of the adjacent sealing flange 9.

In order to reinforce those portions of the frame where the hopper sheet securing portions and the sealing flanges are in the same plane or substantially so, the frame is provided with a laterally projecting flange which passes under the door opening as at 19 and extends upwardly on the inner side of the frame as at 20. The upper end of the reinforcing flange 20 terminates in an enlarged portion which, when the frame is properly attached to the hopper, is disposed in a substantially horizontal plane thereby affording a bracket 21 by which the frame may be secured to an adjacent part of the car under frame such as a center sill (not shown). The reinforcing flange also extends upwardly as at 21a for a short distance along the outer side sheet attaching portion 13 and merges into the portion of the frame 22 designed for mounting any suitable door locking mechanism such as is diagrammatically shown at 23 in Figure 1. To rigidify that portion of the frame adjacent the bracket 21, a flange 24 is provided, which projects inwardly into the door opening 7 and extends downwardly from the upper marginal edge of the opening to a point below the bracket. It will thus be seen that, although the door frame is provided with an opening of maximum area, the frame is sufficiently strong and rugged to effectively withstand the severe service conditions to which railroad cars in general are subjected.

Adjacent its upper end, the plate portion 6 of the frame inclines outwardly as at 25 and terminates in a flanged extension 26, the incline 25 forming means enabling the frame to be secured to neighboring portions of the car structure. The inclined portion 25 may advantageously be integrally formed with apertured hinge lugs 27 for receiving hinge pins 28 adapted to cooperate with hinge straps 29 rigidly connected to the door for hingedly connecting the latter to the frame.

Figure 3:
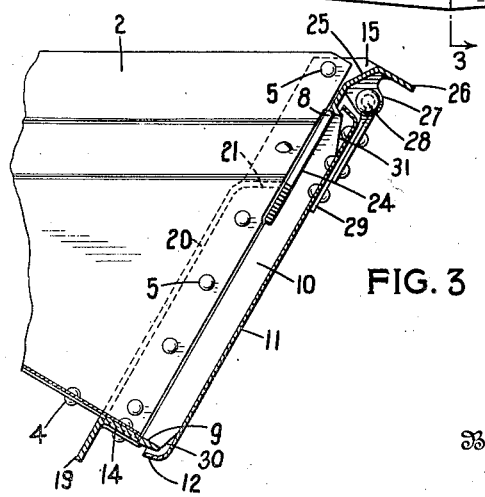
Figure 3 is a sectional view taken on line 3—3 Figure 2, the hopper sheets being shown in section and in elevation.
Figure 4:
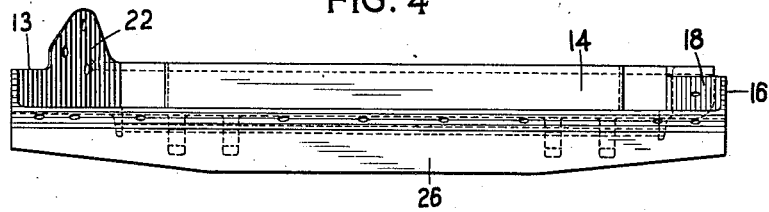
Figure 4 is a top elevational view of the door frame, the door being omitted.
Figure 5:
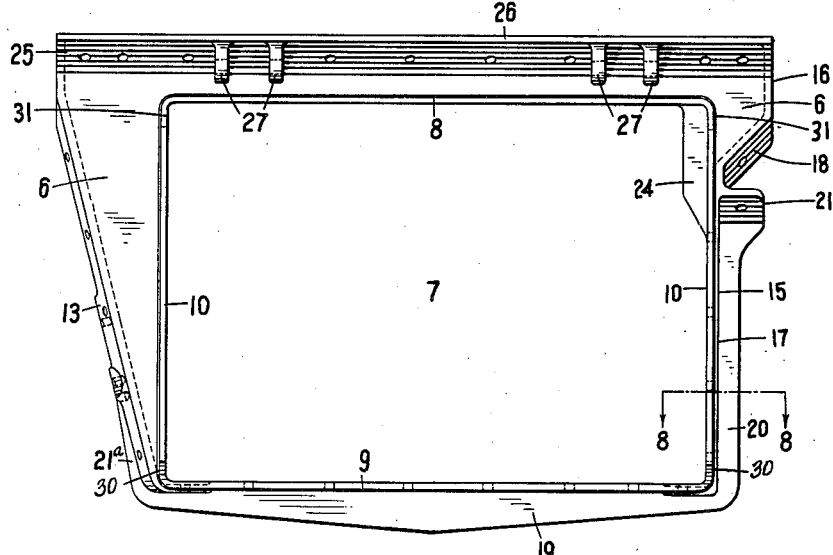
Figure 5 is a front elevational view of the construction shown in Figure 4.
Figures 6, 7, 8:
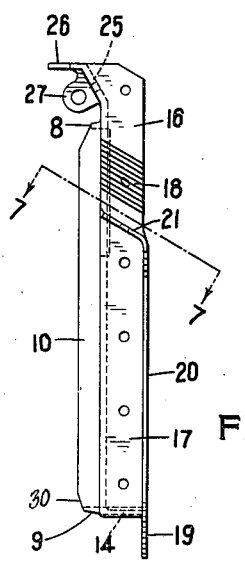
Figure 6 is a side elevational view of the door frame.
Figure 7 is a fragmentary sectional view taken on line 7—7, Figure 6.
Figure 8 is a fragmentary sectional view taken on line 8—8, Figure 5.

The side sealing flanges 10 project outwardly beyond the upper and lower sealing flanges 8 and 9 respectively, and they likewise project outwardly from the plate portion 6 of the frame to a greater extent than the marginal flanges 12 project inwardly from the main body portion of the door. Thus it will be seen that when the door is in closed position, the outer edges of the side sealing flanges 10 engage with the inner face of the door and the outer edges of the upper and lower flanges 8 and 9 respectively terminate short thereof. The outer edge of the lower sealing flange 12, by being spaced from the inner face of the door, as clearly shown in Figure 3, permits any lading which may become lodged between the sealing flange and the door while the latter is being closed to pass to one side or the other of the flange. Lading which may become trapped or pocketed between the lower marginal flange of the door and the adjacent inner face thereof will not, therefore, prevent complete closure of the door. This escape of the lading from between the flanges so as to enable the door to be readily closed is also facilitated by beveling the lower end portions of the side sealing flanges 10 at their junctions with the bottom sealing flange 9, as indicated at 30.

The upper sealing flange 8 terminates short of the inner face of the door so that it will be cleared by the upper flange of the door and thus will not interfere with the opening of the door. For the purpose of affording clearance for the top flange of the door the upper portions of the side sealing flanges 10 slope inwardly toward the upper sealing flange 8, as indicated at 31.

I claim:

1. A hopper car door frame having a cargo discharge opening, outwardly projecting sealing flanges defining the sides of said opening, and inwardly projecting portions affording means for securing the frame to side sheets of the hopper, one of said door sealing flanges constituting a prolongation of the adjacent side sheet securing portion and being provided with a bracket for attachment to a car center sill.

2. A hopper car door frame having a cargo discharge opening, sealing flanges bordering the sides of said opening, portions affording means for securing the frame to side sheets of the hopper, one of said side sheet securing portions and the adjacent sealing flange being substantially parallel, a portion of said last named side sheet securing portion terminating in a laterally projecting reinforcing flange having a portion adapted for attachment to a car center sill.

3. A hopper car door frame having a cargo discharge opening and provided with sealing flanges bordering the the sides of said opening and with portions affording means for securing the frame to side sheets of the hopper, in combination with a hinged door for closing the opening, one of said side sheet securing portions and the adjacent sealing flange being substantially normal to the hinge axis of the door, said last named securing portion being fashioned with a laterally projecting reinforcing flange, the upper edge of said reinforcing flange being adapted for attachment to a car center sill.

4. A hopper car door frame provided with a cargo discharge opening and having sealing flanges defining the sides of said opening, portions affording means for securing said frame to side sheets of the hopper, one of said portions having an integral bracket adapted to be secured to a car center sill, and a flange projecting into said cargo discharge opening for reinforcing the frame adjacent said bracket.

5. A hopper car door frame having a cargo discharge opening and provided with outwardly projecting sealing flanges bordering the sides and lower edge of said opening, in combination with a hinged door for closing said opening, the sealing flanges adjacent the sides of the opening projecting beyond the sealing flange adjacent the lower edge of the opening, said side sealing flanges being adapted to engage the inner face of the door when the latter is in closed position.

6. A hopper car door frame having a lading discharge opening and provided with outwardly projecting sealing flanges bordering said opening, in combination with a hinged door for closing the latter, the outer edges of the sealing flanges adjacent the sides of the opening contacting with the inner face of the door when the latter is in closed position and the outer edges of the sealing flanges adjacent the top and bottom of said opening being spaced from the inner face of the door when the latter is in closed position.

7. A hopper car door frame having a cargo discharge opening and provided with outwardly projecting sealing flanges defining the sides and bottom of said opening, in combination with a hinged door for closing the opening, said door being provided with inwardly projecting flanges for overlapping the sealing flanges of the door frame, the outer edges of the sealing flanges at the sides of said opening contacting with the door when the latter is in closed position and the outer edge of the sealing flange adjacent the bottom of the opening terminating short of the inner face of the closed door.

8. A hopper car door frame having a cargo discharge opening and provided with outwardly projecting sealing flanges bordering said opening, the sealing flanges adjacent the sides of said opening projecting outwardly beyond the sealing flange adjacent the bottom of said opening.

9. A hopper car door frame having a cargo discharge opening and provided with outwardly projecting sealing flanges bordering said opening, the outer edges of the flanges adjacent the top and bottom of said opening terminating short of the outer edges of the flanges adjacent the sides of said opening.

10. A hopper car door frame having a lading discharge opening and provided with an outwardly projecting sealing flange bordering and extending continuously around said opening, in combination with a hinged door for closing the opening, portions of said sealing flange being adapted to engage with the inner surface of the door when the latter is in closed position and portions being spaced therefrom when the door is closed.

11. An integral hopper door frame of substantially trapezoidal shape having a rectangular lading discharge opening, one side wall of said frame comprising a door sealing flange and a portion for attachment to a side sheet of the hopper, said side wall being provided with a laterally projecting reinforcing flange having an angularly offset portion for attachment to a car center sill.

12. An integral hopper door frame having a lading discharge opening, door sealing flanges bordering the sides of said opening, and portions affording means for securing the door frame to the side sheets of the hopper, the door sealing flange on one side of said opening constituting a continuation of the adjacent hopper side sheet attaching portion, and a flange extending at an angle to the last named side sheet securing portion for reinforcing the latter, said flange terminating in an offset portion for attachment to a car center sill.

13. An integral hopper door frame having a lading discharge opening, sealing flanges bordering the sides of said opening, and portions affording means for securing the frame to side sheets of the hopper, one of said side sheet securing portions and the adjacent sealing flange constituting continuations of each other, the said last named portion being provided along the edge thereof remote from the sealing flange with a laterally projecting reinforcing flange.

14. A hopper car door frame having a lading discharge opening and provided with portions for the attachment of the side sheets of a car hopper, one of said side sheet attaching portions being integrally formed with a laterally projecting reinforcing flange extending upwardly from adjacent the bottom of the frame and terminating in a portion adapted to be secured to a car center sill.

15. A hopper car door frame having a lading discharge opening and provided with portions for the attachment of the side sheets of a car hopper, one of said side sheet attaching portions being parallel to and substantially coincident with one of the side marginal edges of said discharge opening and being provided with a laterally projecting reinforcing flange, said flange extending upwardly from adjacent the bottom of the frame and being provided with an angularly offset portion for attachment to a car center sill.

16. A hopper car door frame having a lading discharge opening and provided with inwardly projecting portions for the attachment of the side sheets of a car hopper, one of said side sheet attaching portions being parallel to and substantially coincident with one of the side marginal edges of said discharge opening and being provided along the edge thereof remote from the opening with a laterally projecting reinforcing flange, said flange extending upwardly from adjacent the bottom of the frame and terminating in an angularly disposed portion for attachment to a car center sill.

17. A hopper car door frame having a rectangular lading discharge opening and provided with portions adjacent the side marginal edges of the opening for the attachment of the side sheets of a car hopper, one of said portions extending at an angle to the edge of the opening to which it is adjacent and the other of said portions extending substantially parallel with the edge of the opening to which it is adjacent, the said parallel portion being integrally formed with a laterally projecting reinforcing flange.

18. A hopper car door frame having a rectangular lading discharge opening and provided with inwardly extending portions adjacent the side marginal edges of the opening for the attachment of the side sheets of a car hopper, one of said portions extending at an angle to the edge of the opening to which it is adjacent, the other of said portions extending substantially parallel with the edge of the opening to which it is adjacent, the said parallel portion being integrally formed with a laterally projecting reinforcing flange extending upwardly from adjacent the lower portion of the frame and provided with an angularly offset portion for attachment to a car center sill.

19. A hopper car door frame having a lading discharge opening and provided with portions for the attachment of the side and slope sheets of a car hopper, the slope sheet attaching portion and one of the side sheet attaching portions being respectively parallel to and substantially coincident with the adjacent marginal edges of the opening and being respectively provided with a continuously extending reinforcing flange, said side sheet attaching portion being provided with an offset portion formed integrally with the flange thereof for attachment to a car center sill.

20. A hopper car door frame having a lading discharge opening and provided with portions for the attachment of the side and slope sheets of a car hopper, the slope sheet attaching portion and one of the side sheet attaching portions being respectively parallel and substantially coincident with the adjacent marginal edges of the opening and being respectively provided with a continuously extending reinforcing flange, the portion of the flange along the side sheet attaching portion terminating in an angularly offset portion for attachment to a car center sill.

21. A hopper car door frame having a lading discharge opening and provided with side walls for the attachment of the side sheets of a car hopper, one of said side sheet attaching walls being offset intermediate its ends to provide the latter with upper and lower portions disposed in substantially vertical planes, said upper portion being adapted to be secured to a car center sill.

22. A hopper car door frame having a lading discharge opening and provided with side walls for the attachment of the side sheets of a car hopper, one of said side sheet attaching walls being offset intermediate its ends to provide the latter with upper and lower substantially parallel portions, said upper portion being adapted to be secured to a car center sill.

23. A hopper car door frame having a lading discharge opening and provided with side walls for the attachment of the side sheets of a car hopper, one of said side sheet attaching walls being offset intermediate its ends to provide the latter with upper and lower substantially parallel portions, said upper portion being adapted to be secured to a car center sill and said lower portion being provided with a laterally projecting reinforcing flange.

24. A hopper car door frame having a lading discharge opening and provided with side walls for the attachment of the side sheets of a car hopper, one of said side sheet attaching walls being offset intermediate its ends to provide the latter with upper and lower substantially parallel portions connected by a relatively inclined portion, said upper portion being adapted to be secured to a car center sill and said lower portion being provided adjacent the intersection thereof with said inclined portion with a bracket for attachment to the car center sill.

25. A hopper car door frame having a lading discharge opening and provided with side walls for the attachment of the side sheets of a car hopper, one of said side sheet attaching walls being offset intermediate its ends to provide the latter with upper and lower substantially parallel portions connected by a relatively inclined portion, said lower portion being provided with a laterally projecting flange terminating adjacent the point of intersection of the lower and inclined portions in a portion for attachment to the car center sill.

26. A hopper car door frame having a lading discharge opening and provided with side walls for the attachment of the side sheets of a car hopper, one of said side sheet attaching walls being offset intermediate its ends to provide the latter with upper and lower substantially parallel portions, said lower portion being substantially coincident with the adjacent side marginal edge of the discharge opening and the upper portion being spaced therefrom and being adapted to be secured to a car center sill.

27. A hopper car door frame having a lading discharge opening and provided with side walls for the attachment of the side sheets of a car hopper, one of said side sheet attaching walls being parallel to and substantially coincident with the adjacent side marginal edge of the door and being provided with an outwardly projecting flange terminating in an offset portion for attachment to a car center sill, the frame being reinforced adjacent said offset portion by a flange projecting into said discharge opening.

28. A hopper car door frame having a lading discharge opening and provided with side walls for the attachment of the side sheets of a car hopper, one of said side sheet attaching walls being parallel to and substantially coincident with the adjacent side marginal edge of the door and being provided with an outwardly projecting flange extending upwardly from adjacent the lower marginal edge of the discharge opening and terminating below the upper marginal edge thereof, said frame being also provided with a flange projecting into the discharge opening adjacent said parallel wall and extending downwardly from the upper marginal edge of the opening to adjacent the upper portion of said upwardly extending flange.

In testimony whereof I affix my signature.

WILLIAM E. WINE.